(12) United States Patent
Williams et al.

(10) Patent No.: US 11,635,315 B2
(45) Date of Patent: Apr. 25, 2023

(54) OPTICAL FIBER TIP MICRO ANEMOMETER

(71) Applicant: US Gov't as represented by Secretary of Air Force, Wright-Patterson AFB, OH (US)

(72) Inventors: Jeremiah C Williams, Dayton, OH (US); Hengky Chandrahalim, Beavercreek, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 1 day.

(21) Appl. No.: 17/245,645

(22) Filed: Apr. 30, 2021

(65) Prior Publication Data

US 2021/0341320 A1    Nov. 4, 2021

Related U.S. Application Data

(60) Provisional application No. 63/017,691, filed on Apr. 30, 2020.

(51) Int. Cl.
*G01F 1/10* (2006.01)
*G01L 11/02* (2006.01)
*G01F 1/115* (2006.01)

(52) U.S. Cl.
CPC .............. *G01F 1/103* (2013.01); *G01F 1/115* (2013.01); *G01L 11/025* (2013.01)

(58) Field of Classification Search
None
See application file for complete search history.

(56) References Cited

U.S. PATENT DOCUMENTS

| | | | | |
|---|---|---|---|---|
| 5,638,174 A | * | 6/1997 | Henderson | G01N 21/5907 356/73 |
| 7,397,549 B2 | * | 7/2008 | Williams | F41G 7/226 342/62 |
| 10,942,313 B2 | * | 3/2021 | Chandrahalim | G01J 3/0218 |
| 11,287,575 B2 | * | 3/2022 | Williams | G02B 6/29358 |

(Continued)

OTHER PUBLICATIONS

R. P. Hu and X. G. Huang, "A simple fiber-optic flowmeter based on bending loss," IEEE Sensors Journal, vol. 9, p. 1952-1955, 2009.

(Continued)

*Primary Examiner* — Octavia Davis Hollington
*Assistant Examiner* — Jermaine L Jenkins
(74) *Attorney, Agent, or Firm* — AFMCLO/JAZ; Chastity D. S. Whitaker

(57) ABSTRACT

A passive microscopic flow sensor includes a three-dimensional microscopic optical structure formed on a cleaved tip of an optical fiber. The three-dimensional microscopic optical structure includes a post attached off-center to and extending longitudinally from the cleaved tip of the optical fiber. A rotor of the three-dimensional microscopic optical structure is received for rotation on the post. The rotor has more than one blade. Each blade has a reflective undersurface that reflects a light signal back through the optical fiber when center aligned with the optical fiber, the blades of the rotor shaped to rotate at a rate related to a flow rate.

3 Claims, 7 Drawing Sheets
(1 of 7 Drawing Sheet(s) Filed in Color)

(56) References Cited

U.S. PATENT DOCUMENTS

2019/0086195 A1* 3/2019 Onishi .................. G01H 9/004
2019/0376821 A1* 12/2019 Donzier ................. G01F 1/103

OTHER PUBLICATIONS

J. W. Costa, M. A. R. Franco, V. A. Serrao, C. M. B. Cordeiro and M. T. R. Giraldi, "Macrobending SMS fiber-optic anemometer and flow sensor," Optical Fiber Technology, vol. 52, p. 101981, 2019.

P.-Y. Ju, C.-H. Tsai, L.-M. Fu and C.-H. Lin, "Microtluidic flow meter and viscometer utilizing flow-induced vibration on an optic fiber cantilever," in 2011 16th International Solid-State Sensors, Actuators and Microsystems Conference, 2011.

M. R. Maschmann, G. J. Ehlert, B. T. Dickinson, D. M. Phillips, C. W. Ray, G. W. Reich and J. W. Baur, "Bioinspired carbon nanotube fuzzy fiber hair sensor for air-flow detection," Advanced Materials, vol. 26, p. 3230-3234, 2014.

Y. Zhang, F. Wang, Z. Liu, Z. Duan, W. Cui, J. Han, Y. Gu, Z. Wu, Z. Jing, C. Sun and others, "Fiber-optic anemometer based on single-walled carbon nanotube coated tilted fiber Bragg grating," Optics Express, vol. 25, p. 24521-24530, 2017.

Y. Li, G. Yan, L. Zhang and S. He, "Microfluidic flowmeter based on micro "hot-wire" sandwiched Fabry-Perot interferometer," Optics Express, vol. 23, p. 9483-9493, 2015.

C. Wang, X. Zhang, J. Jiang, K. Liu, S. Wang, R. Wang, Y. Li and T. Liu, "Fiber optical temperature compensated anemometer based on dual Fabry-Perot sensors with sealed cavity," Optics Express, vol. 27, p. 18157-18168, 2019.

G. Liu, Q. Sheng, W. Hou and M. Han, "Optical fiber vector flow sensor based on a silicon Fabry-Perot interferometer array," Optics Letters, vol. 41, p. 4629-4632, 2016.

S. Pevec and D. Donlagic, "Miniature Fiber-Optic Pitot Tube Sensor," IEEE Sensors Journal, vol. 20, p. 4732-4739, 2020.

Y. Zhao, P. Wang, R. Lv and X. Liu, "Highly sensitive airflow sensor based on Fabry-Perot interferometer and Vernier effect," Journal of Lightwave Technology, vol. 34, p. 5351-5356, 2016.

B. Zhou, H. Jiang, C. Lu and S. He, "Hot cavity optical fiber Fabry-Perot interferometer as a flow sensor with temperature self-calibrated," Journal of Lightwave Technology, vol. 34, p. 5044-5048, 2016.

C.-L. Lee, K.-W. Liu, S.-H. Luo, M.-S. Wu and C.-T. Ma, "A hot-polymer fiber Fabry-Perot interferometer anemometer for sensing airflow," Sensors, vol. 17, p. 2015, 2017.

G. Liu, M. Han and W. Hou, "High-resolution and fast-response fiber- optic temperature sensor using silicon Fabry-Pérot cavity," Optics Express, vol. 23, p. 7237-7247, 2015.

Y. Liu, B. Liang, X. Zhang, N. Hu, K. Li, F. Chiavaioli, X. Gui and T. Guo, "Plasmonic fiber-optic photothermal anemometers with carbon nanotube coatings," Journal of Lightwave Technology, vol. 37, p. 3373-3380, 2019.

M. Power, A. J. Thompson, S. Anastasova and G.-Z. Yang, "A monolithic force-sensitive 3D microgripper fabricated on the tip of an optical fiber using 2-photon polymerization," Small, vol. 14, p. 1703964, 2018.

T. Gissibl, S. Thiele, A. Herkommer and H. Giessen, "Two-photon direct laser writing of ultracompact multi-lens objectives," Nature Photonics, vol. 10, p. 554, 2016.

A. Bertoncini and C. Liberate, "Polarization Micro-Optics: circular polarization from a Fresnel Rhomb 3D printed on an optical fiber," IEEE Photonics Technology Letters, vol. 30, p. 1882-1885, 2018.

T. Gissibl, S. Thiele, A. Herkommer and H. Giessen, "Sub-micrometre accurate free-form optics by three-dimensional printing on single-mode fibres," Nature Communications, vol. 7, p. 1-9, 2016.

H. E. Williams, D. J. Freppon, S. M. Kuebler, R. C. Rumpf and M. A. Melino, "Fabrication of three-dimensional micro-photonic structures on the tip of optical fibers using SU-8," Optics Express, vol. 19, p. 22910-22922, 2011.

S. Zhang, S.-J. Tang, S. Feng, Y.-F. Xiao, W. Cui, X. Wang, W. Sun, J. Ye, P. Han, X. Zhang and others, "High-Q Polymer Microcavities Integrated on a Multicore Fiber Facet for Vapor Sensing," Advanced Optical Materials, vol. 7, p. 1900602, 2019.

K. Markiewicz and P. Wasylczyk, "Photonic-chip-on-tip: compound photonic devices fabricated on optical fibers," Optics Express, vol. 27, p. 8440-8445, 2019.

H. Wang, Z. Xie, M. Zhang, H. Cui, J. He, S. Feng, X. Wang, W. Sun, J. Ye, P. Han and others, "A miniaturized optical fiber microphone with concentric nanorings grating and microsprings structured diaphragm," Optics & Laser Technology, vol. 78, p. 110-115, 2016.

Q. Liu, Y. Zhan, S. Zhang, S. Feng, X. Wang, W. Sun, J. Ye and Y. Zhang, ""Optical tentacle" of suspended polymer micro-rings on a multicore fiber facet for vapor sensing," Optics Express, vol. 28, p. 11730-11741, 2020.

J. W. Smith, J. S. Suelzer, N. G. Usechak, V. P. Tondiglia and H. Chandrahalim, "3-D Thermal Radiation Sensors on Optical Fiber Tips Fabricated Using Ultrashort Laser Pulses," in 2019 20th International Conference on Solid-State Sensors, Actuators and Microsystems & Eurosensors XXXIII (Transducers & Eurosensors XXXIII), 2019.

* cited by examiner

OPTICAL FIBER TIP MICRO ANEMOMETER

CROSS-REFERENCE TO RELATED APPLICATIONS

This application claims the benefit of priority under 35 U.S.C. § 119(e) to U.S. Provisional Application Ser. No. 63/017,691 entitled "Mechanically-enabled microscale Fabry-Perot optical cavity on an optical fiber tip," filed 30 Apr. 2020, the contents and cited references of which are incorporated herein by reference in their entirety.

This application is related to U.S. patent application Ser. No. 17/229,986 entitled "Monolithically integrated microscale pressure sensor on an optical fiber tip", filed 21 Apr. 2021, which in turn claims the benefit of priority under 35 U.S.C. § 119(e) to U.S. Provisional Application Ser. No. 63/172,170 entitled "Mechanically-enabled microscale Fabry-Perot optical cavity on an optical fiber tip," filed 8 Apr. 2021, the contents and cited references of which are incorporated herein by reference in their entirety.

ORIGIN OF THE INVENTION

The invention described herein was made by employees of the United States Government and may be manufactured and used by or for the Government of the United States of America for governmental purposes without the payment of any royalties thereon or therefore.

BACKGROUND

1. Technical Field

The present disclosure generally relates to microscopic passive optical sensors fabricated on a tip of an optical fiber and methods of fabricating same.

2. Description of the Related Art

Optical fiber flow sensors, or anemometers, present several potential benefits for aerial vehicles. Their small footprint encourages sampling many points in the flow field, which could be used to realize smart wings capable of adapting to turbulence to improve efficiency. Due to their small size such sensors could also be integrated into micro-unmanned aerial vehicles or other spatially constrained systems. This scaling particularly benefits rotating anemometers, where short blades offer greater resolution by spinning at high rotational velocities that would damage larger devices.

Several optical fiber anemometers have already been demonstrated in the literature. Sensing mechanisms include flow-induced bending losses, fiber vibration behavior, and contacting electrodes with carbon nanotube (CNT) forests, but the most popular technique utilizes optical resonators. The optical response of Bragg gratings, Fabry-Perot cavities, and surface plasmon resonators depend on the device geometry or temperature. Fluid flow affects these parameters through direct pressure, or by cooling an actively heated element. Drawbacks of these designs include the broadband spectrum analysis equipment needed to analyze them, and the power needed to produce heat with a sufficiently powerful laser or active component. Many of these devices also operate stretched across the flow field, precluding localized sensing, and making their placement a challenge.

To date, fiber anemometers have been fabricated using a variety of processes including fiber splicing, UV-curable adhesives, femtosecond laser micromachining, CNT growth, hydrofluoric acid etching, and integration with silicon. While impressive feats of engineering, these techniques are limited to relatively simple geometries. This contrasts with the emerging microfabrication technique of two-photon polymerization (2PP), which can achieve unprecedented 3D freedom with nanometer resolutions and 200 nm lateral feature sizes.

Traditional stereolithography uses single-photon polymerization to solidify a photoactive resin by introducing a photon of sufficient energy to cross-stitch and solidify it. The 2PP process utilizes a high-power laser beam to achieve the same polymerization energy with two photons at half the traditional wavelength. The energy capable of performing this is distributed nonlinearly within the beam and produces a very small reaction site. Some of the devices already produced on fiber tips with 2PP microfabrication include microgrippers, imaging optics, polarizing optics, photonic crystals, whispering gallery mode resonators, microphones, and micro-ring resonators.

BRIEF SUMMARY

In one aspect, the present disclosure provides a passive microscopic flow sensor that includes a three-dimensional microscopic optical structure formed on a cleaved tip of an optical fiber. The three-dimensional microscopic optical structure includes a post attached off-center to and extending longitudinally from the cleaved tip of the optical fiber. A rotor of the three-dimensional microscopic optical structure is received for rotation on the post. The rotor has more than one blade. Each blade has a reflective undersurface that reflects a light signal back through the optical fiber when center aligned with the optical fiber, the blades of the rotor shaped to rotate at a rate related to a flow rate.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1A:
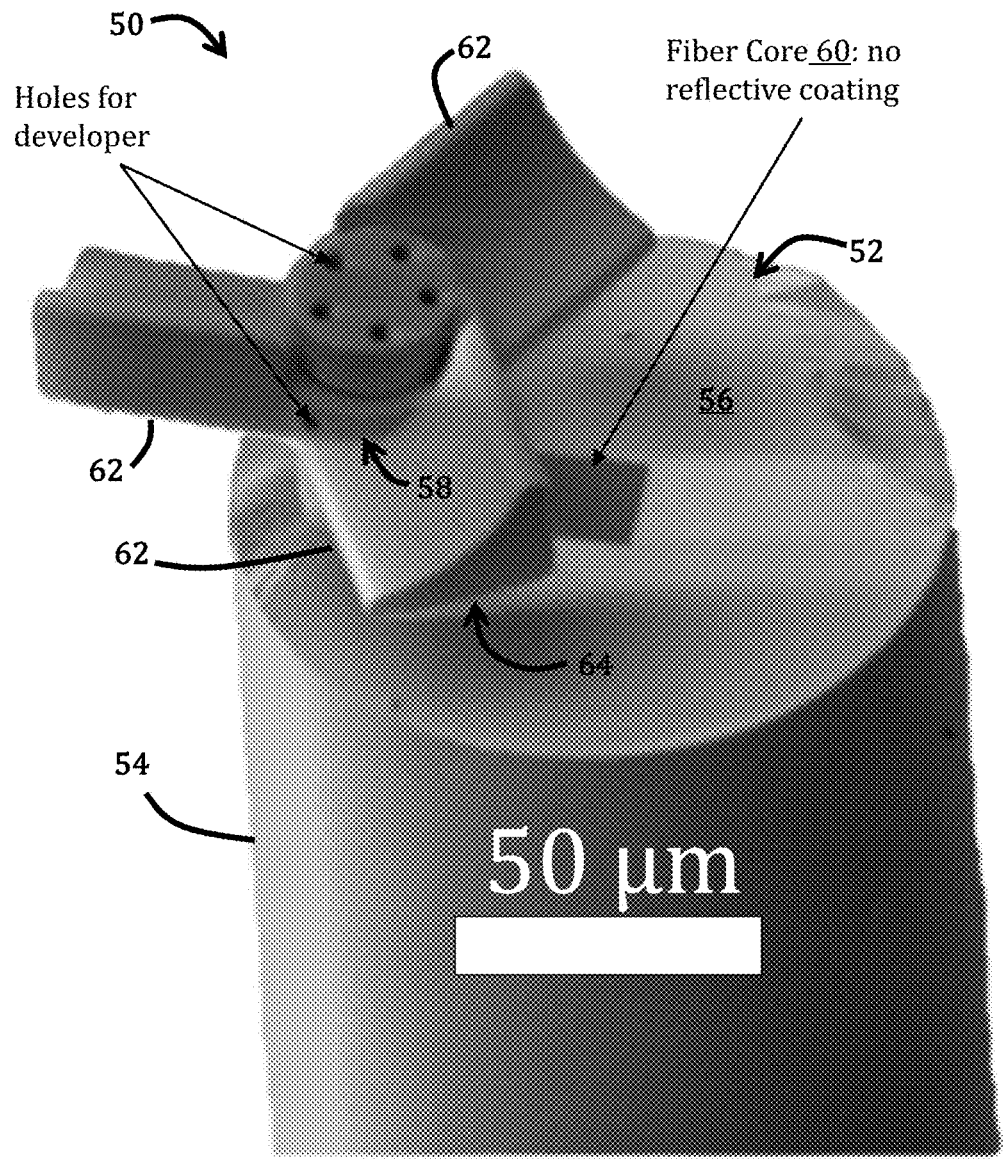
FIG. 1A depicts a scanning electron microscope (SEM) image of a fiber tip anemometer, according to aspects of the present disclosure.

Referring now to the figures, and in particular to FIG. 1, in one or more embodiments, the innovation presents a micro anemometer 50 (otherwise referenced as the device 50) fabricated by two-photon polymerization (2PP) microfabrication onto the tip 52 of an optical fiber 54. The device 50 is located entirely on cleaved face 56 of the fiber 54 and requires only one entry point to the flow field. The sensing feature maintains a small profile, roughly 150 µm across. A simple, single-wavelength optical signal is used to measure incident flow with a spinning rotor 58. In this work the utility of this micro-mechanical sensor is successfully demonstrated. This highlights the potential for an improved design to function over a large operating range and offer a unique solution to measuring flow in spatially constrained applications.

The present disclosure demonstrates a micro anemometer 50 monolithically integrated onto a cleaved optical fiber 56 via two-photon polymerization microfabrication. The sensing mechanism features an aerodynamically driven rotor 58 which spins in response to an incident flow. Light exiting the core 60 of the optical fiber 54 is reflected back into the fiber core 60 at a flow-dependent rate as the blades 62 pass by. The device 50 operated successfully over a range of 9.35-24.28 liters per minute (LPM) using nitrogen gas and achieved a linear response of 706±43 reflections/LPM over a range of 10.97-11.79 LPM.

Figure 1B:
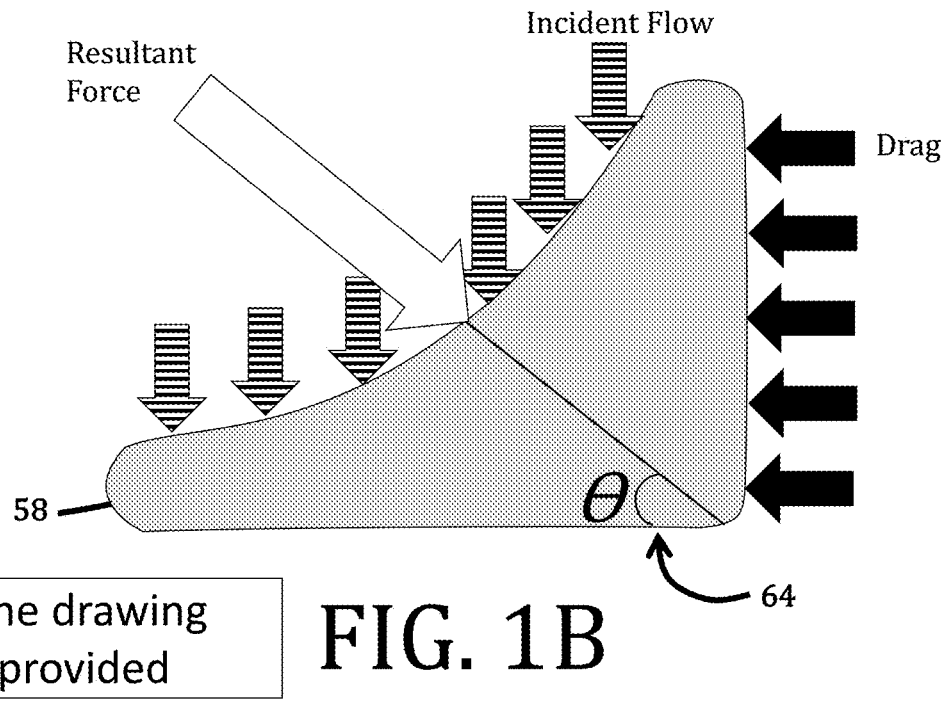
FIG. 1B depicts a graphical diagram of simplified aerodynamic forces acting on one rotor blade of the fiber tip anemometer of FIG. 1A, according to one or more embodiments.
Figure 1C:
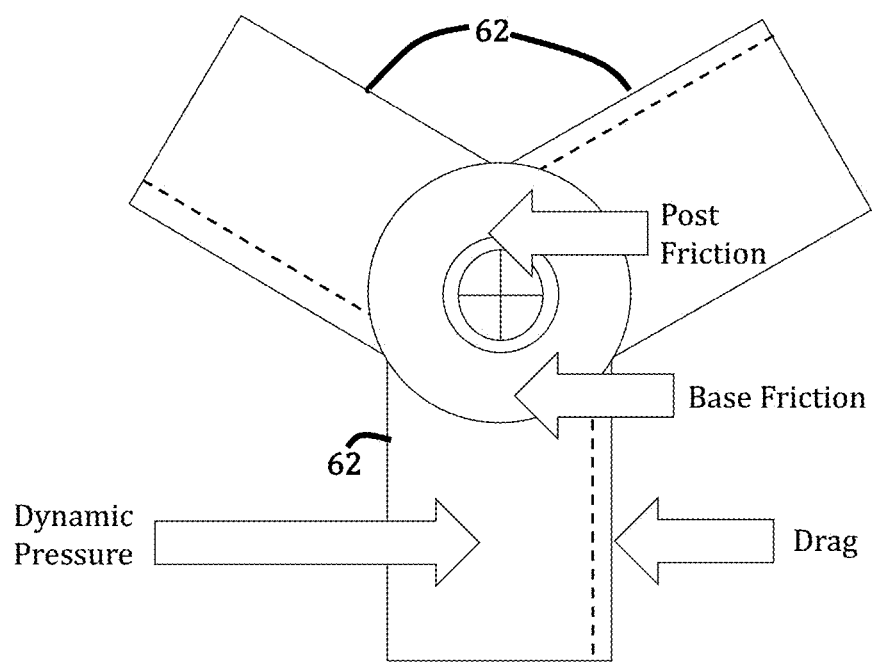
FIG. 1C depicts a graphical diagram of a simplified dynamic situation during operation of a three-blade rotor of the fiber tip anemometer of FIG. 1A, according to one or more embodiments.

A. Simplified Dynamics:

FIG. 1A depicts a scanning electron microscope (SEM) image of a fiber tip anemometer 50 according to aspects of the present disclosure. FIG. 1B depicts a graphical diagram of simplified aerodynamic forces acting on one rotor blade 62 of the fiber tip anemometer 50 of FIG. 1A. FIG. 1C depicts a graphical diagram of a simplified dynamic situation during operation of a three-blade rotor 58 of the fiber tip anemometer 50 of FIG. 1A.

Figure 2A:
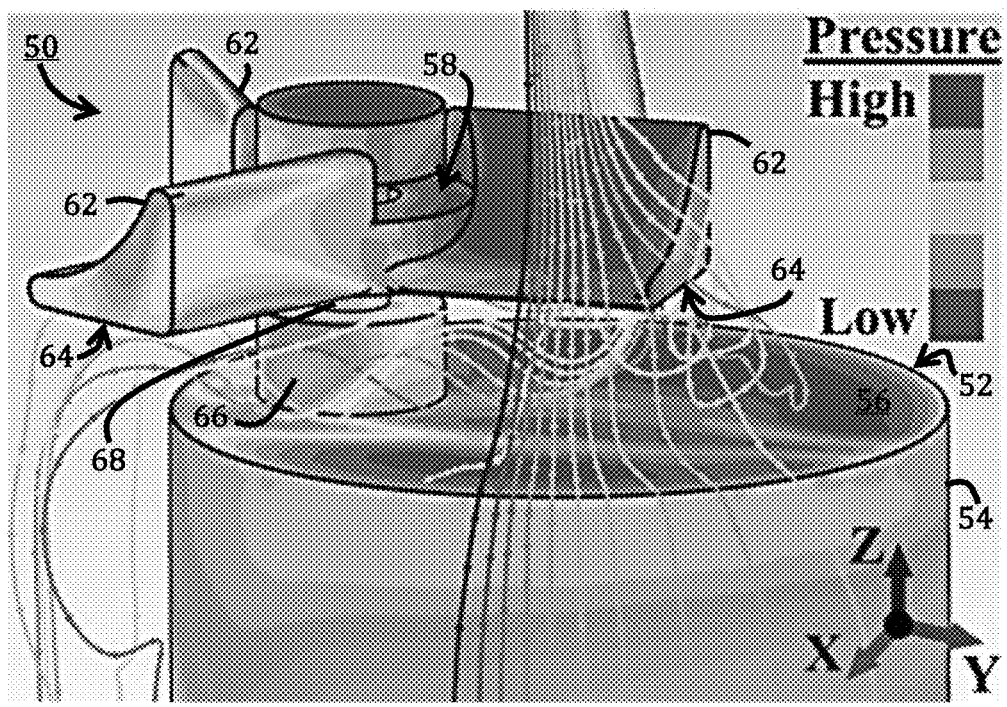
FIG. 2A depicts a top three-dimensional view of the fiber tip anemometer of FIG. 1A with color pressure annotations based on computational fluid dynamics (CFD) simulation, according to one or more embodiments.

The flow sensor 50 is designed to rotate in response to incident flow, spinning faster at greater flow rates. Light exiting the fiber core 60 is coupled back into the fiber 56 by the flat surface 56 on the bottom 64 of the rotor blades 62 as they pass over the core 60; no light couples back into the fiber 54 when the rotor blade 62 is not over the core 60. The flow regime used in this work is considered incompressible based on its Mach number, which was calculated to be 0.15 for the highest flow rate. This is below the common cutoff criteria of 0.3 which denotes the transition to a compressible regime. With this assumption, the dynamic pressure exerted by the flow is estimated using P=pv2/2 where p is the density of the flow and v is the velocity of the flow. The shape of the blades 62 causes both radial and axial reaction forces. The radial force drives the rotation, while the axial force presses the rotor 58 into the base of the stator 66 (FIG. 2A). Rotation is opposed by the drag of the blades 62, friction on the center post 68 (FIG. 2A), and friction on the stator base 66 (FIG. 2A). A sum of moments around the center of the stator 66 (FIG. 2A) can be approximated by:

$$PA_T\cos(\theta)l_1 = \mu_k PA_T(\sin(\theta)l_2 + \cos(\theta)l_3) + C_d A_F \frac{\rho v_r^2}{2} l_1 \quad (1)$$

where $\theta$ is the angle of the resultant force, $\rho_k$ is the coefficient of friction, $A_T$ is the area of the top of the blade, P is the dynamic pressure, $I_1$, $I_2$, and $I_3$ are the distances from the center of the stator to the center of the blade, the inner edge of the rotor, and the contact points on the base respectively, $C_d$ is the drag coefficient, $A_F$ is the area of the front of the blades, and $v_r$ is the rotational velocity of the blades. This simplified situation is pictured in FIG. 1C.

Figure 2B:
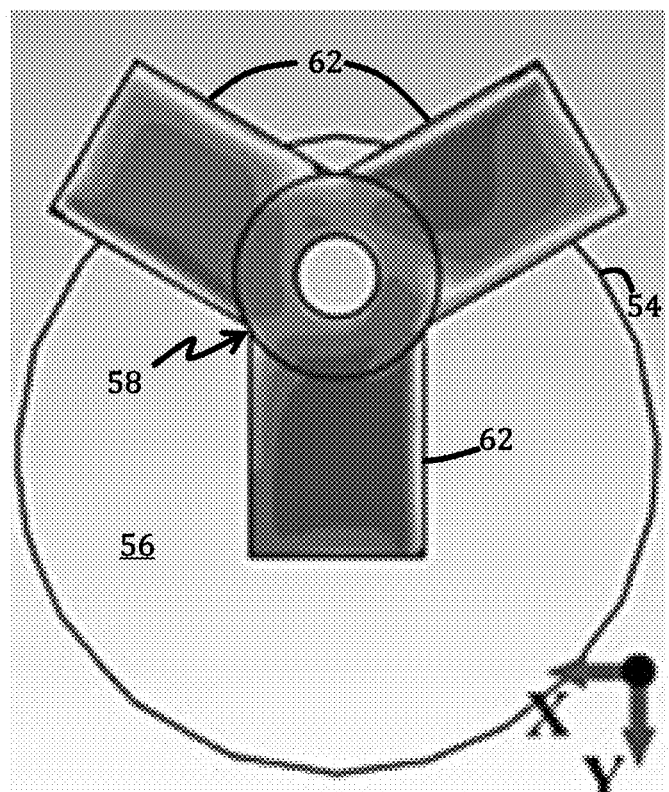
FIG. 2B depicts a top view of the three-blade rotor of the of the fiber tip anemometer of FIG. 1A color annotated with CFD based pressures, according to one or more embodiments.
Figure 2C:
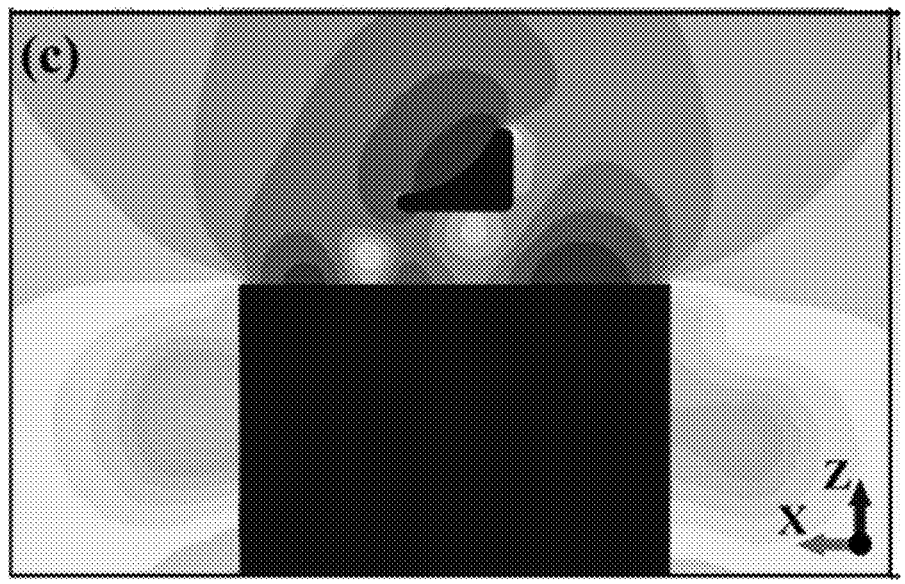
FIG. 2C depicts a two-dimensional (2D) slice at the center of the fiber as a blade passes over color annotated with CFD based pressures, according to one or more embodiments.
Figure 2D:
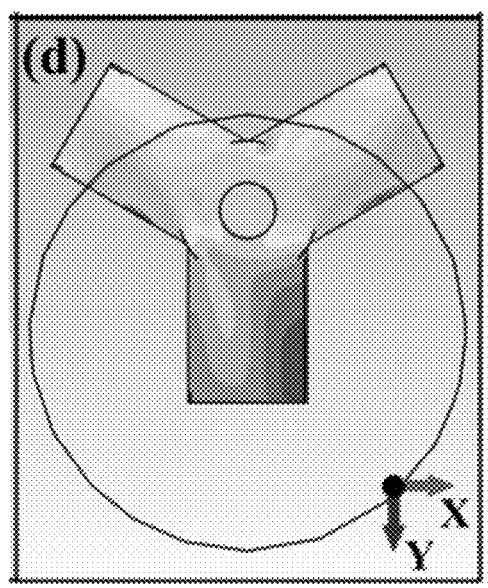
FIG. 2D depicts a bottom view of the three-blade rotor of the of the fiber tip anemometer of FIG. 1A color annotated with CFD based pressures, according to one or more embodiments.

B. Preliminary Computational Fluid Dynamics (CFD):

FIG. 2A depicts a top three-dimensional view of the fiber tip anemometer 50 of FIG. 1A with color pressure annotations based on computational fluid dynamics (CFD) simulation. The depiction is annotated with erratic flow lines in selected colors for contrast and that contact the blade 62 and the fiber 54 as significant out-of-plane flow toward a post 68 of the fiber tip anemometer 50 generated by a fiber face 56. FIG. 2B depicts a top view of the three-blade rotor 58 of the of the fiber tip anemometer 50 of FIG. 1A color annotated with CFD based pressures. FIG. 2C depicts a two-dimensional (2D) slice at the center of the fiber 54 as a blade passes over color annotated with CFD based pressures. FIG. 2D depicts a bottom view of the three-blade rotor 58 of the of the fiber tip anemometer 50 of FIG. 1A color annotated with CFD based pressures.

Experimentally, the situation is significantly more complicated than the simplified model described by Eqn. (1). To better understand the operation of this anemometer, CFD analysis was performed (using Ansys Fluent®) to provide a more realistic picture. A two-dimensional (2D) slice at the center of the fiber as a blade passes over it is pictured in FIG. 2C and shows areas of high pressure develop at the fiber behind, under, and in front of the blade. A 3D image, FIG. 2A, plots several erratic path lines that contact the blade and the fiber. They capture the significant out-of-plane flow (toward the post) generated by the fiber face. Examining the top and bottom of the rotor (FIG. 2B and FIG. 2D, respectively), one observes the different pressures experienced by individual blades as they pass over the fiber. This complex situation contributes to the erratic rotation of the device. Further modeling is necessary to fully evaluate the fluid dynamic situation.

C. Fabrication: With reference again to FIG. 1, the device 50 is fabricated with the Nanoscribe GmbH Photonic Professional GT 2PP microfabrication system using the IP-DIP photoactive resin. A cleaved portion of single-mode fiber 54 is mounted in the Nanoscribe using a fiber chuck. The Nanoscribe's 63X objective is then raised into the resin, and the surface of the fiber located by the operator. A mode-locked 780-nm laser (using 120-fs pulses and running at an 80-MHz repetition rate) is then scanned through the resin to polymerize the desired structure. Our device is fabricated with a 200-μm resolution in the X-Y plane, and built up in 300-μm thick layers in Z. The Nanoscribe's "LaserPower" input parameter was set to 40% for this work, while a scan speed of 10 mm/s was used. The resin is removed by immersing the fiber chuck in Propylene Glycol Methyl Ether Acetate (PGMEA) for 20 minutes, which is washed away by immersing in isopropyl alcohol (IPA) for 10 minutes. This technique is also described in J. W. Smith, J. S. Suelzer, N. G. Usechak, V. P. Tondiglia and H. Chandrahalim, "3-D Thermal Radiation Sensors on Optical Fiber Tips Fabricated Using Ultrashort Laser Pulses," in 2019 20th International Conference on Solid-State Sensors, Actuators and Microsystems & Eurosensors XXXIII (TRANSDUCERS & EUROSENSORS XXXIII), 2019.

Figure 3A:
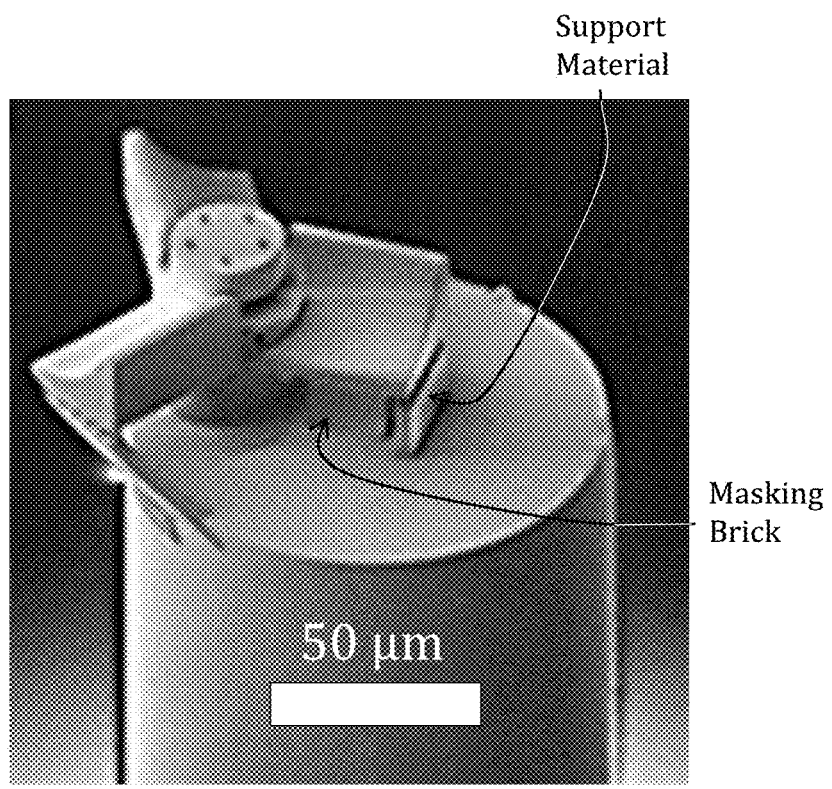
FIG. 3A depicts a top three-dimensional view of an example fiber tip anemometer having a masking brick and support material, according to one or more embodiments.
Figure 3B:
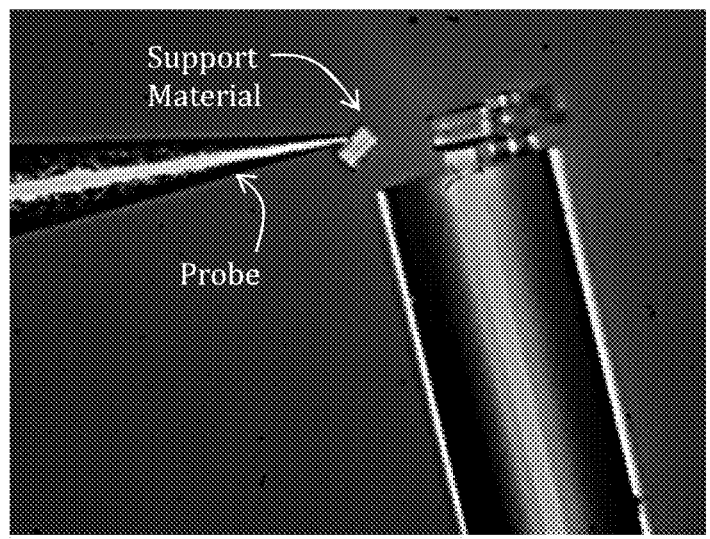
FIG. 3B depicts a side view of the example fiber tip anemometer during removal of the support material by a probe, according to one or more embodiments.
Figure 3C:
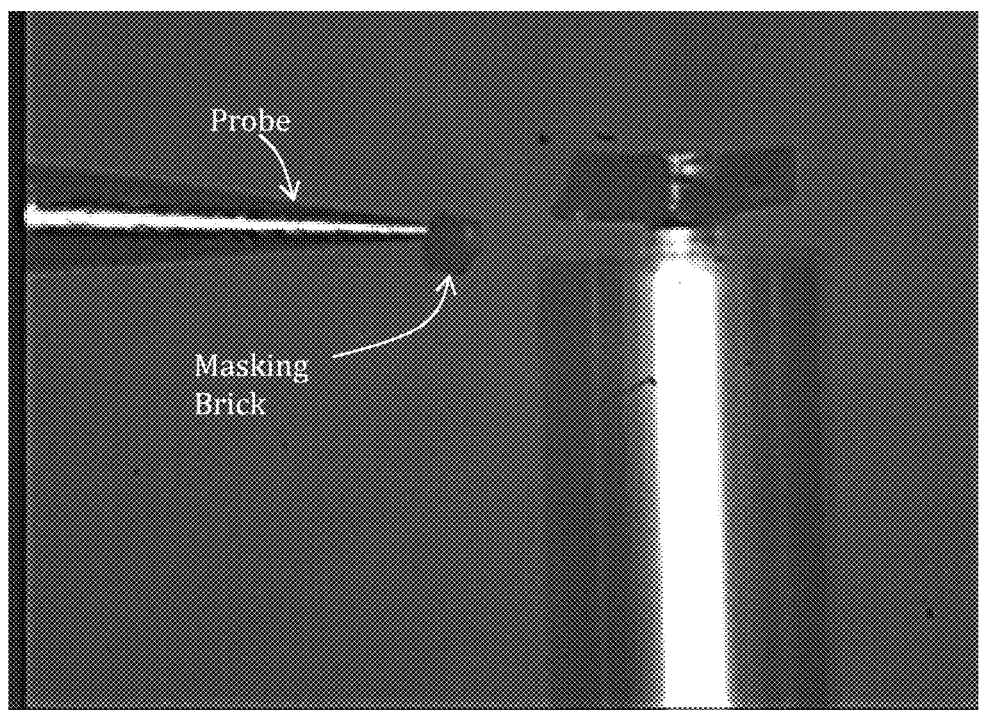
FIG. 3C depicts a side view of the example fiber tip anemometer during removal of the masking brick by the probe, according to one or more embodiments.

FIG. 3A depicts a top three-dimensional view of an example fiber tip anemometer having a masking brick and support material. FIG. 3B depicts a side view of the example fiber tip anemometer during removal of the support material by a probe. FIG. 3C depicts a side view of the example fiber tip anemometer during removal of the masking brick by the probe.

The device is fabricated with breakable support structures for each rotor blade and a masking cap over the core of the fiber. Twelve one-micron pillars connect the blades to the support structures. The masking cap is a 20-μm cube. The inner pillar of the stator is 12 μm in diameter and has a clearance of 2 μm with the rotor. Holes are included to encourage the PGMEA to enter these tight clearances. Three hemispherical features are included on the base of the stator to reduce friction with the rotor. FIGS. 3A-3C contain images of the supported device. The supports are broken away using a 0.1-μm diameter semiconductor analysis probe, pictured in FIG. 3B. With the supports removed, a gold reflective coating is deposited via plasma sputtering. The masking cube is then removed with the probe (captured in FIG. 3C) revealing the core of the fiber.

III. FLOW MEASUREMENT EXPERIMENT

Figure 4A:
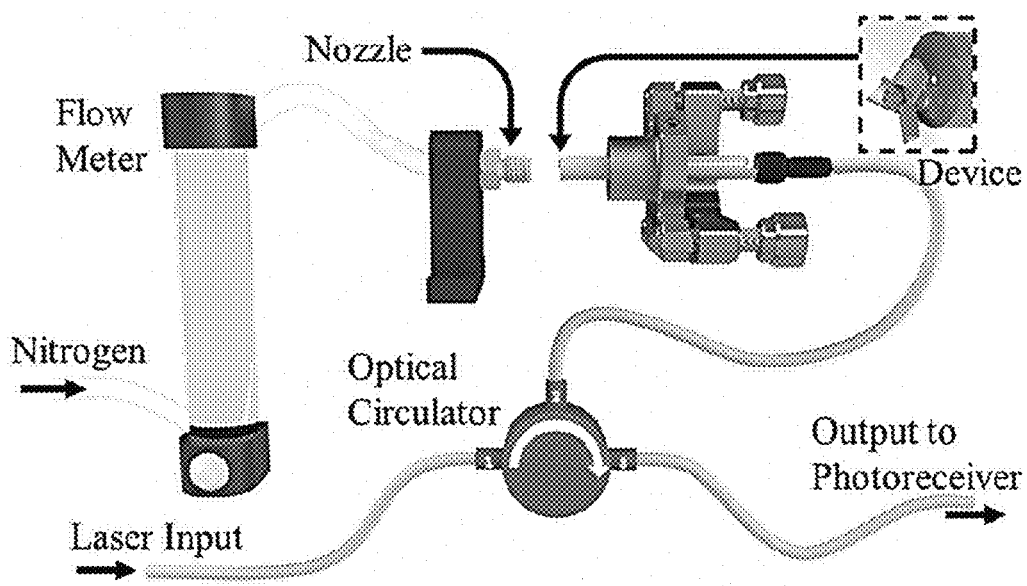
FIG. 4A depicts a diagram of a testing setup used during experimental use of the fiber tip anemometer of FIG. 1A, according to one or more embodiments.
Figure 4B:
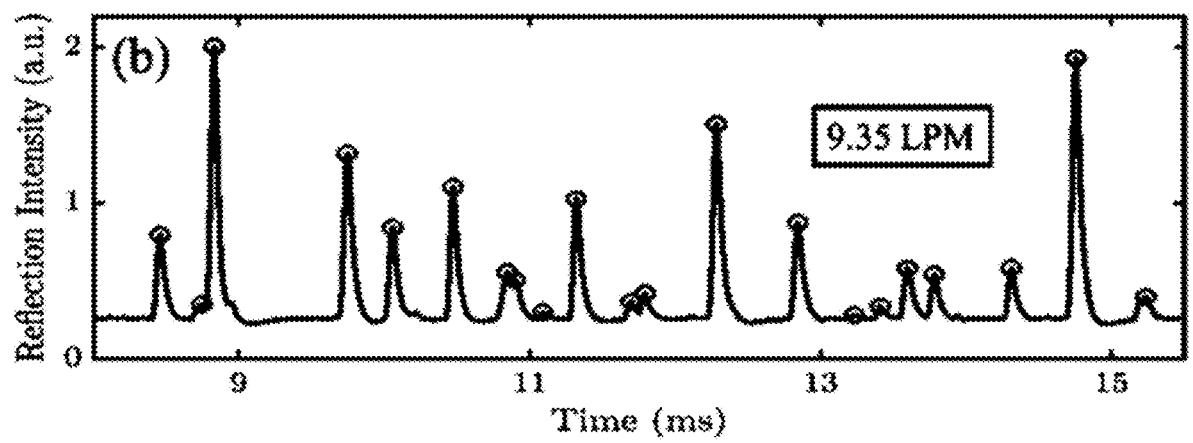
FIG. 4B depicts a graphical plot of reflection intensity as a function of time for the fiber tip anemometer of FIG. 1A, according to one or more embodiments.

FIG. 4A depicts a diagram of a testing setup used during experimental use of the fiber tip anemometer of FIG. 1A. FIG. 4B depicts a graphical plot of reflection intensity as a function of time at 9.35 liters per minute (LPM) of nitrogen (N$_2$) gas for the fiber tip anemometer of FIG. 1A.

A. SETUP: The experiment is performed with the setup pictured in FIG. 4A. The reflection response from the device is isolated with an optical circulator. A 1550-nm laser is connected to the first port, the device fiber is connected to the second port, and a photoreciever is connected to the third port. The device fiber is mounted into a fiber chuck and a mirror mount, monitored with an optical microscope, and oriented to maximize rotational velocity and consistency.

Compressed Nitrogen is connected to an analog flow controller. A ¼" to ⅛" compression fitting reducer is used as the outlet nozzle. Two flow ranges are evaluated, a coarse range from 9.35-24.28 LPM with steps of roughly 1.7 LPM, and a fine range from 10.97-11.79 LPM with steps of 0.17 LPM. These values utilize the full operating range and smallest graduations of our flow meter respectively. The fine range was chosen around the greatest rate of change observed over the coarse range. While spinning, the reflection spectrum of the device is recorded over 0.5 seconds with a digital oscilloscope. Three to five measurements are taken at each flow rate.

B. Results: The device's rotational velocity is directly correlated to the flow rate incident on the rotor blades, however the rotation was erratic and did not produce a steady-state rotation. Nevertheless, the relationship can be quantified by summing the reflection events over the 0.5 second measurement. A low-pass, moving average filter is applied to the reflection response of each measurement. Reflection peaks, caused by a rotor blade passing over the fiber core, are counted using a peak-finding function. The same process is applied to each measurement. An example of this reflection counting is depicted in FIG. 4B.

We posit that the rotational inconsistency is caused by three factors: dry, sticky friction between the rotor and stator, backflow from the fiber face, and inconsistent contact caused by the rotor clearances. Friction and contact could be improved by implementing integrated bearings, adding lubricant, or operating in a liquid. Backflow may be reduced by measuring The experiment is performed with the setup pictured in FIG. 4A. The reflection response from the device is isolated with an optical circulator. A 1550-nm laser is connected to the first port, the device fiber is connected to the second port, and a photoreciever is connected to the third port. The device fiber is mounted into a fiber chuck and a mirror mount, monitored with an optical microscope, and oriented to maximize rotational velocity and consistency.

Compressed Nitrogen is connected to an analog flow controller. A ¼" to ⅛" compression fitting reducer is used as the outlet nozzle. Two flow ranges are evaluated, a coarse range from 9.35-24.28 LPM with steps of roughly 1.7 LPM, and a fine range from 10.97-11.79 LPM with steps of 0.17 LPM. These values utilize the full operating range and smallest graduations of our flow meter respectively. The fine range was chosen around the greatest rate of change observed over the coarse range. While spinning, the reflection spectrum of the device is recorded over 0.5 seconds with a digital oscilloscope. Three to five measurements are taken at each flow rate.

B. Results: The device's rotational velocity is directly correlated to the flow rate incident on the rotor blades, however the rotation was erratic and did not produce a steady-state rotation. Nevertheless, the relationship can be quantified by summing the reflection events over the 0.5 second measurement. A low-pass, moving average filter is applied to the reflection response of each measurement. Reflection peaks, caused by a rotor blade passing over the fiber core, are counted using a peak-finding function. The same process is applied to each measurement. An example of this reflection counting is depicted in FIG. 4B.

We posit that the rotational inconsistency is caused by three factors: dry, sticky friction between the rotor and stator, backflow from the fiber face, and inconsistent contact caused by the rotor clearances. Friction and contact could be improved by implementing integrated bearings, adding lubricant, or operating in a liquid. Backflow may be reduced by measuring flow parallel to the fiber face, although this would increase shearing stresses on the base.

Figure 5:
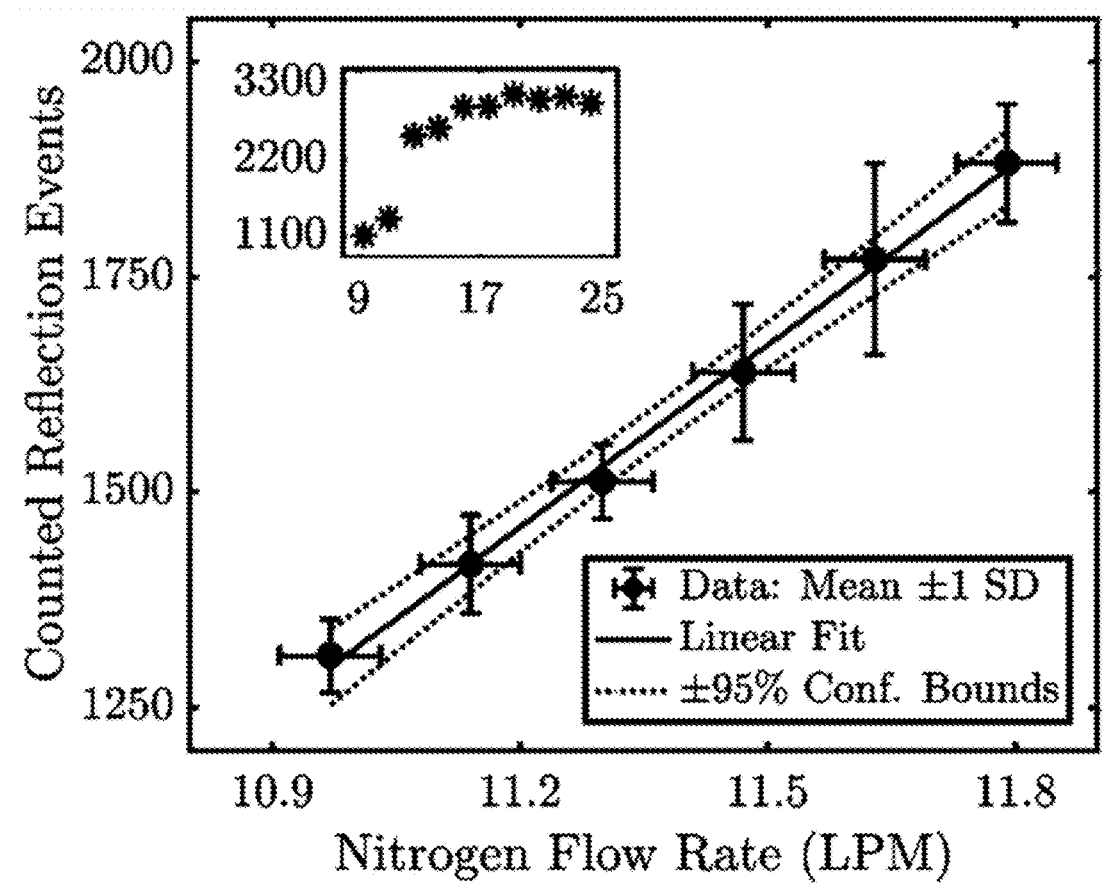
FIG. 5 depicts a graphical plot of counted reflection events as a function of flow rate for the fiber tip anemometer of FIG. 1A, according to one or more embodiments.

FIG. 5 depicts a graphical plot of counted reflection events as a function of nitrogen flow rate in LPM for the fiber tip anemometer of FIG. 1A. Device response is in a linear regime. Vertical error bars represent one standard deviation from the mean of repeated measurements. The inset plot depicts the response from 9.35-24.28 LPM, with axis matching the primary plot. The linear fit and 95% confidence bounds are included as the solid and dashed lines respectively.

The anemometer functioned over a wide flow range, but displayed nonlinear behavior at this scale. This response is pictured in the inset of FIG. 5. Greater backflow from the fiber face likely slowed down the rotor at these higher flows. Within the smaller flow range, the response is effectively a linear approximation of the larger trend. This is pictured in the primary portion of FIG. 5. The vertical error bars represent one standard deviation of the mean from repeated measurements, the horizontal error bars represent the repeatability reported for the flow meter, and the red lines represents a linear fit with the 95% confidence band. This smaller range is more appropriate for precise sensing, since the response is primarily linear over the selected flow rates. Considerable variation did occur at any given value, which we again attribute to the backflow at the fiber face, dry friction, and inconsistent contact with the base. From the linear fit, a sensitivity of 706±43 reflections/LPM, including one coefficient standard error, was observed.

IV. CONCLUSION

This work demonstrates a micro anemometer on the tip of an optical fiber. Flow is sensed by counting the reflections introduced by rotor blades as it spins in response to incident flow. The entire device is monolithically realized via 2PP microfabrication. The sensor demonstrates operation over a range of 9.35-24.28 LPM, and a linear response from 10.97-11.79, where a sensitivity of 706±43 reflections/LPM is achieved. This proof-of-concept device represents the foundation for a miniaturized, high-resolution, wide operating range sensor for future aerial vehicles.

The following references cited above are hereby incorporated by reference in their entirety:

[1] R. P. Hu and X. G. Huang, "A simple fiber-optic flowmeter based on bending loss," IEEE Sensors journal, vol. 9, p. 1952-1955, 2009.

[2] J. W. Costa, M. A. R. Franco, V. A. Serrao, C. M. B. Cordeiro and M. T. R. Giraldi, "Macrobending SMS fiber-optic anemometer and flow sensor," Optical Fiber Technology, vol. 52, p. 101981, 2019.

[3] P.-Y. Ju, C.-H. Tsai, L.-M. Fu and C.-H. Lin, "Microfluidic flow meter and viscometer utilizing flow-induced vibration on an optic fiber cantilever," in 2011 16th International Solid-State Sensors, Actuators and Microsystems Conference, 2011.

[4] M. R. Maschmann, G. J. Ehlert, B. T. Dickinson, D. M. Phillips, C. W. Ray, G. W. Reich and J. W. Baur, "Bio-inspired carbon nanotube fuzzy fiber hair sensor for air-flow detection," Advanced Materials, vol. 26, p. 3230-3234, 2014.

[5] Y. Zhang, F. Wang, Z. Liu, Z. Duan, W. Cui, J. Han, Y. Gu, Z. Wu, Z. Jing, C. Sun and others, "Fiber-optic anemometer based on single-walled carbon nanotube coated tilted fiber Bragg grating," Optics express, vol. 25, p. 24521-24530, 2017.

[6] Y. Li, G. Yan, L. Zhang and S. He, "Microfluidic flowmeter based on micro "hot-wire" sandwiched Fabry-Perot interferometer," Optics Express, vol. 23, p. 9483-9493, 2015.

[7] C. Wang, X. Zhang, J. Jiang, K. Liu, S. Wang, R. Wang, Y. Li and T. Liu, "Fiber optical temperature compensated anemometer based on dual Fabry-Perot sensors with sealed cavity," Optics express, vol. 27, p. 18157-18168, 2019.

[8] G. Liu, Q. Sheng, W. Hou and M. Han, "Optical fiber vector flow sensor based on a silicon Fabry-Perot interferometer array," Optics letters, vol. 41, p. 4629-4632, 2016.

[9] S. Pevec and D. Donlagic, "Miniature Fiber-Optic Pitot Tube Sensor," IEEE Sensors Journal, vol. 20, p. 4732-4739, 2020.

[10] Y. Zhao, P. Wang, R. Lv and X. Liu, "Highly sensitive airflow sensor based on Fabry-Perot interferometer and Vernier effect," Journal of Lightwave Technology, vol. 34, p. 5351-5356, 2016.

[11] B. Zhou, H. Jiang, C. Lu and S. He, "Hot cavity optical fiber Fabry-Perot interferometer as a flow sensor with temperature self-calibrated," Journal of Lightwave Technology, vol. 34, p. 5044-5048, 2016.

[12] C.-L. Lee, K.-W. Liu, S.-H. Luo, M.-S. Wu and C.-T. Ma, "A hot-polymer fiber Fabry-Perot interferometer anemometer for sensing airflow," Sensors, vol. 17, p. 2015, 2017.

[13] G. Liu, M. Han and W. Hou, "High-resolution and fast-response fiber-optic temperature sensor using silicon Fabry-Perot cavity," Optics express, vol. 23, p. 7237-7247, 2015.

[14] Y. Liu, B. Liang, X. Zhang, N. Hu, K. Li, F. Chiavaioli, X. Gui and T. Guo, "Plasmonic fiber-optic photothermal anemometers with carbon nanotube coatings," Journal of Lightwave Technology, vol. 37, p. 3373-3380, 2019.

[15] M. Power, A. J. Thompson, S. Anastasova and G.-Z. Yang, "A monolithic force-sensitive 3D microgripper fabricated on the tip of an optical fiber using 2-photon polymerization," Small, vol. 14, p. 1703964, 2018.

[16] T. Gissibl, S. Thiele, A. Herkommer and H. Giessen, "Two-photon direct laser writing of ultracompact multi-lens objectives," Nature Photonics, vol. 10, p. 554, 2016.

[17] A. Bertoncini and C. Liberale, "Polarization Micro-Optics: circular polarization from a Fresnel Rhomb 3D printed on an optical fiber," IEEE Photonics Technology Letters, vol. 30, p. 1882-1885, 2018.

[18] T. Gissibl, S. Thiele, A. Herkommer and H. Giessen, "Sub-micrometre accurate free-form optics by three-dimensional printing on single-mode fibres," Nature Communications, vol. 7, p. 1-9, 2016.

[19] H. E. Williams, D. J. Freppon, S. M. Kuebler, R. C. Rumpf and M. A. Melino, "Fabrication of three-dimensional micro-photonic structures on the tip of optical fibers using SU-8," Optics express, vol. 19, p. 22910-22922, 2011.

[20] S. Zhang, S.-J. Tang, S. Feng, Y.-F. Xiao, W. Cui, X. Wang, W. Sun, J. Ye, P. Han, X. Zhang and others, "High-Q Polymer Microcavities Integrated on a Multicore Fiber Facet for Vapor Sensing," Advanced Optical Materials, vol. 7, p. 1900602, 2019.
[21] K. Markiewicz and P. Wasylczyk, "Photonic-chip-on-tip: compound photonic devices fabricated on optical fibers," Optics express, vol. 27, p. 8440-8445, 2019.
[22] H. Wang, Z. Xie, M. Zhang, H. Cui, J. He, S. Feng, X. Wang, W. Sun, J. Ye, P. Han and others, "A miniaturized optical fiber microphone with concentric nanorings grating and microsprings structured diaphragm," Optics & Laser Technology, vol. 78, p. 110-115, 2016.
[23] Q. Liu, Y. Zhan, S. Zhang, S. Feng, X. Wang, W. Sun, J. Ye and Y. Zhang, ""Optical tentacle" of suspended polymer micro-rings on a multicore fiber facet for vapor sensing," Optics Express, vol. 28, p. 11730-11741, 2020.
[24] J. D. Anderson Jr, Fundamentals of aerodynamics, Tata McGraw-Hill Education, 2010.
[25] J. W. Smith, J. S. Suelzer, N. G. Usechak, V. P. Tondiglia and H. Chandrahalim, "3-D Thermal Radiation Sensors on Optical Fiber Tips Fabricated Using Ultrashort Laser Pulses," in 2019 20th International Conference on Solid-State Sensors, Actuators and Microsystems & Eurosensors XXXIII (TRANSDUCERS & EUROSENSORS XXXIII), 2019.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

In the preceding detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A passive microscopic flow sensor comprising:
    an optical fiber; and
    a three-dimensional microscopic optical structure formed on a cleaved tip of the optical fiber comprising:
        a post attached off-center to and extending longitudinally from the cleaved tip of the optical fiber; and
        a rotor received for rotation on the post and having more than one blade, each blade having a reflective undersurface that reflects a light signal back through the optical fiber when center aligned with the optical fiber, the blades of the rotor shaped to rotate at a rate related to a flow rate.

2. The passive microscopic flow sensor of claim 1, wherein the three-dimensional microscopic optical structure is formed by photosensitive polymer three-dimensional micromachining device that performs a two-photon polymerization process.

3. The passive microscopic flow sensor of claim 1, wherein the optical fiber supports single mode light propagation for a 1550 to 1650 nm wavelength range.

* * * * *